US012183883B2

(12) United States Patent
Liu et al.

(10) Patent No.: US 12,183,883 B2
(45) Date of Patent: Dec. 31, 2024

(54) SOLID ELECTROLYTE AND POLYMER LITHIUM ION BATTERY

(71) Applicant: SHENZHEN CAPCHEM TECHNOLOGY CO., LTD., Guangdong (CN)

(72) Inventors: Zhongbo Liu, Guangdong (CN); Yuanyuan Kang, Guangdong (CN); Furen Zheng, Guangdong (CN); Yonghong Deng, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 605 days.

(21) Appl. No.: 17/434,016

(22) PCT Filed: Apr. 10, 2020

(86) PCT No.: PCT/CN2020/084077
§ 371 (c)(1),
(2) Date: Aug. 26, 2021

(87) PCT Pub. No.: WO2020/207450
PCT Pub. Date: Oct. 15, 2020

(65) Prior Publication Data
US 2022/0140389 A1  May 5, 2022

(30) Foreign Application Priority Data

Apr. 10, 2019 (CN) ......................... 201910284872.8

(51) Int. Cl.
H01M 10/0565 (2010.01)
H01M 10/0525 (2010.01)

(52) U.S. Cl.
CPC ... *H01M 10/0565* (2013.01); *H01M 10/0525* (2013.01); *H01M 2300/0082* (2013.01); *H01M 2300/0085* (2013.01)

(58) Field of Classification Search
CPC ......... H01M 10/0565; H01M 10/0525; H01M 2300/0082; H01M 2300/0085; H01M 2300/0068; H01M 2300/0071; H01M 2300/0091; Y02E 60/10
USPC ................................................. 429/492, 304
See application file for complete search history.

(56) References Cited

U.S. PATENT DOCUMENTS

| 5,925,283 A | 7/1999 | Taniuchi et al. | |
| 6,156,458 A * | 12/2000 | Brodd ............... | H01M 10/0565 429/316 |
| 2008/0145759 A1 * | 6/2008 | Sung ................. | H01M 4/58 429/219 |
| 2013/0108934 A1 * | 5/2013 | Lee .................. | H01M 12/08 429/207 |
| 2017/0025739 A1 * | 1/2017 | Caratelli .......... | H01Q 5/35 |
| 2018/0342767 A1 * | 11/2018 | Ahn ................. | H01M 4/525 |

FOREIGN PATENT DOCUMENTS

| CN | 1199408 A | 11/1998 | |
| CN | 1302309 A | 7/2001 | |
| CN | 1464002 A | 12/2003 | |
| CN | 102282709 A | 12/2011 | |
| CN | 103113558 A | 5/2013 | |
| CN | 103855423 A | 6/2014 | |
| CN | 105098234 A | 11/2015 | |
| CN | 105591154 A | 5/2016 | |
| CN | 106876725 A | 6/2017 | |
| CN | 109065945 A | 12/2018 | |
| CN | 109256583 A | 1/2019 | |
| CN | 110071327 A | 7/2019 | |
| JP | S55108179 A | 8/1980 | |
| JP | 2000090730 A | 3/2000 | |
| JP | 2004079327 A * | 3/2004 | |
| JP | 2004339422 A | 12/2004 | |
| KR | 20180076709 A | 7/2018 | |
| WO | WO-2018008500 A1 * | 1/2018 | ............... H01B 1/06 |

OTHER PUBLICATIONS

International Search Report of PCT Patent Application No. PCT/CN2020/084077 issued on Jul. 8, 2020.
Heng Zhang et al., Lithium Bis(fluorosulfonyl)Imide/Poly(Ethylene Oxide) Polymer Electrolyte, Electrochimica Acta, 2014, vol. 133, pp. 529-538.
M. Marzantowicz et al., The Influence of Phase Segregation on Properties of Semicrystalline PEO: LiTFSI Electrolytes, Solid State Ionics, 2008, vol. 179, pp. 1670-1678.

* cited by examiner

Primary Examiner — James M Erwin
Assistant Examiner — Kevin Nguyen

(57) ABSTRACT

In order to overcome the problem of low ionic conductivity in the existing polymer solid electrolyte, the disclosure provides a solid electrolyte, comprising a polymer, a lithium salt and an additive, the additive is selected from an aprotic organic solvent with a carbon number lower than 10 and a relative dielectric constant higher than 3.6; the mass content of the lithium salt is 30%~90%, and the mass content of the additive is 0.01%~2%, based on the total mass of the solid electrolyte being 100%. Further provided is a polymer lithium ion battery comprising the solid electrolyte. According to the solid electrolyte of the disclosure, a trace amount of small molecule aprotic organic solvent with high dielectric constant is introduced as an additive, which can inhibit crystallization of the solid electrolyte, promote transmission of lithium ions in the electrolyte, and improve the ionic conductivity of the solid electrolyte at room temperature.

18 Claims, No Drawings

SOLID ELECTROLYTE AND POLYMER LITHIUM ION BATTERY

TECHNICAL FIELD

The disclosure belongs to the technical field of lithium ion batteries, in particular to a solid electrolyte and a polymer lithium ion battery.

BACKGROUND

Compared with traditional electrochemical energy devices such as lead-acid batteries, nickel-hydrogen batteries and nickel-chromium batteries, lithium-ion batteries have the advantages of high energy density, high working voltage, no memory effect, long cycle life and environmental friendliness, and have been widely used in electronic and electrical fields such as mobile phones and notebook computers. While traditional lithium ion batteries use a liquid electrolyte composed of carbonate solvent with low flash point, lithium salt and additive, which has great potential safety hazards when the temperature rises due to battery abuse. On the other hand, with the increasing demand for energy density in electronic digital products, electric vehicles and large-scale energy storage devices, lithium-ion batteries gradually adopt ternary cathode materials with high nickel and high voltage and anode materials such as silicon, silicon carbon and lithium metal. These materials have a series of problems such as large volume expansion and easy decomposition in application, which is a greater challenge to the safety of batteries.

Using solid electrolyte instead of low flash point electrolyte may fundamentally improve the safety performance of batteries. Compared with inorganic oxide solid electrolyte and sulfide solid electrolyte, polymer solid electrolyte has the advantages of low raw material cost, simple processing technology and good interface contact between electrode and electrolyte. However, compared with liquid electrolyte, solid electrolyte, especially polymer solid electrolyte, has poor ionic conductivity, which greatly limits its application. It is generally believed that the lithium ion transport in polymer electrolyte is realized by the swing of the segment, and the ion mobility rate is limited by the swing speed of the polymer segment. Generally, the ionic conductivity of polymer electrolyte at room temperature could only reach about $1*10^{-6}$ Scm$^{-2}$, which cannot meet the requirements. In order to achieve high ionic conductivity of polymer electrolyte, it is necessary to increase its usage temperature. Taking PEO-LiTFSI as an example, when the temperature rises to 80° C., the ionic conductivity could only reach $1*10^{-3}$ Scm$^{-2}$ (H. Zhang et al./Electrochimica Acta 133 (2014) 529-538). However, increasing the usage temperature of the battery requires an additional heating system, which will increase the cost and reduce the energy density of the whole system. On the other hand, high temperature operation will accelerate the degradation of the battery, which is unfavorable to the practical application of the battery.

In order to solve the problem of ionic conductivity of polymer electrolyte, people have made a lot of efforts, but at present, the ionic conductivity at room temperature has not been significantly improved, which is considered as the limitation of polymer solid electrolyte.

In some current studies, adding plasticizer to solid electrolyte is a common method to improve ionic conductivity of solid electrolyte. Usually, the amount of plasticizer is more than 10 weight %. On the one hand, adding plasticizer would increase the safety risk of battery flammability, on the other hand, plasticizer would cause the decrease of electrolyte mechanical strength.

In other studies, increasing lithium ion concentration to improve conductivity is a conventional way in this field. However, in organic electrolyte system, when lithium salt concentration is higher than a certain threshold, lithium salt anions will form anion clusters, and agglomerated anion clusters would increase the activation energy of lithium ion transport, thus reducing the ionic conductivity of organic electrolyte system with high concentration lithium salt.

In addition, the lithium salt concentration in polymer electrolyte is increased. When the cooperation between lithium salt and polymer is not good and the lithium salt concentration is higher than a certain threshold, it cannot be completely dissociated in polymer, phase separation would occur, and lithium salt or polymer-lithium salt composite crystal would precipitate, which greatly reduces the ionic conductivity of electrolyte. In the PEO-LiTFSI system, when the LiTFSI concentration is increased, PEO/LiTFSI eutectic crystals (molar ratios of 3/1 and 6/1) and LiTFSI crystals would precipitate, resulting in a sharp drop in overall electrolyte ionic conductivity (M. Marzantowicz et al/Solid State Ionics, 179 (2008) 1670-1678).

SUMMARY

Aiming at the problem of low ionic conductivity in the existing polymer solid electrolyte, the disclosure provides a solid electrolyte and a polymer lithium ion battery.

The technical solution adopted by the disclosure to solve the technical problem is as follows:

In an aspect, the disclosure provides a solid electrolyte, including a polymer, a lithium salt and an additive, wherein the additive is selected from an aprotic organic solvent with a carbon number lower than 10 and a relative dielectric constant higher than 3.6;

the mass content of the lithium salt is 30%~90%, and the mass content of the additive is 0.01%~2%, based on the total mass of the solid electrolyte being 100%.

Optionally, the mass content of the lithium salt is 50%~80%, based on the total mass of the solid electrolyte being 100%.

Optionally, the additive is selected from one or more of nitriles, sulfones, sulfoxides, sulfates, sulfites, sulfonates, ketones, ethers, carboxylates, carbonates, phosphates, borates, silicates and amides.

Optionally, the additive is selected from one or more of dimethyl sulfoxide, sulfolane, 1,3-propane sultone, γ-butyrolactone, ethyl acetate, trimethyl borate, trimethyl phosphate, dimethyl oxalate, dimethyl carbonate, ethylene carbonate, propylene carbonate, N-methylpyrrolidone, acetone, methyl ethyl ketone, tetrahydrofuran, 1,3-dioxolane, ethylene glycol dimethyl ether, acetonitrile and succinonitrile.

Optionally, the dielectric constant of the polymer is greater than 2.

Optionally, the polymer is selected from one or more of a homopolymer or a copolymer containing a halogenated or unhalogenated repeating unit; wherein the repeating unit is selected from one or more of a halogenated or unhalogenated alkylene oxide compound, a halogenated or unhalogenated siloxane compound, a halogenated or unhalogenated olefin compound, a halogenated or unhalogenated acrylate compound, a halogenated or unhalogenated carboxylic acid ester compound, a halogenated or unhalogenated carbonate compound, a halogenated or unhalogenated amide compound and a halogenated or unhalogenated cyano-containing compound.

Optionally, the weight-average molecular weight of the polymer is 1,000~10,000,000.

Optionally, the lithium salt includes one or more of LiBr, LiI, LiClO$_4$, LiBF$_4$, LiPF$_6$, LiSCN, LiB$_{10}$Cl$_{10}$, LiCF$_3$SO$_3$, LiCF$_3$CO$_2$, LiBF$_2$C$_2$O$_4$, LiB(C$_2$O$_4$)$_2$, LiN(SO$_2$CF$_3$)$_2$, LiN(SO$_2$F)$_2$, LiN(SO$_2$F)(SO$_2$CF$_3$), LiC(SO$_2$CF$_3$)$_3$ and LiPF$_2$(C$_2$O$_4$).

Optionally, the solid electrolyte further includes an inorganic filler and a porous structure supporting layer;
the mass content of the inorganic filler is less than or equal to 40% based on the total mass of the solid electrolyte being 100%, and the inorganic filler includes one or more of LiF, LiCl, Li$_2$CO$_3$, SiO$_2$, Al$_2$O$_3$, TiO$_2$, ZrO$_2$, MgO, Li$_7$La$_3$Zr$_2$O$_{12}$, Li$_x$La$_3$Zr$_y$A$_{2-y}$O$_{12}$, sulfide electrolyte, Li$_{1.3}$Al$_{0.3}$Ti$_{1.7}$(PO$_4$)$_3$, Li$_{1.5}$Al$_{0.5}$Ge$_{1.5}$(PO$_4$)$_3$, Li$_{2.88}$PO$_{3.73}$N$_{0.14}$, montmorillonite, kaolin and diatomite, wherein, in Li$_x$La$_3$Zr$_y$A$_{2-y}$O$_{12}$, A is one of Ta, Al and Nb, 6≤x≤7, 0.5≤y≤2;
the porous structure support layer includes one or more of PVDF, PVDF-HFP, polyimide, cellulose and its modified products, nylon, polyethylene, polypropylene, glass fiber and carbon fiber.

In an another aspect, the disclosure provides a polymer lithium ion battery, including a positive electrode, a negative electrode and the above-described solid electrolyte.

According to the solid electrolyte provided by the disclosure, a high polymer is used as an electrolyte, a lithium salt with a mass content of 30%~90% is added, and meanwhile, a trace amount of small molecule aprotic organic solvent with high dielectric constant is introduced as an additive, whose main function is to complex with lithium ions and cooperate with anion cluster network to form a large number of lithium ion transmission channels independent of segmental motion, thereby inhibiting crystallization of the solid electrolyte, promoting transmission of lithium ions in the electrolyte, and improving the ionic conductivity of the solid electrolyte at room temperature.

DETAILED DESCRIPTION

In order to make the technical problems, technical solutions and beneficial effects of the present disclosure clearer, the present disclosure will be further described in detail with reference to the following embodiments. It should be understood that the specific embodiments described herein are only used to illustrate the present disclosure, not intended to limit the present disclosure.

The disclosure provides a solid electrolyte, including a polymer, a lithium salt and an additive, wherein the additive is selected from an aprotic organic solvent with a carbon number lower than 10 and a relative dielectric constant higher than 3.6;
the mass content of the lithium salt is 30%~90%, and the mass content of the additive is 0.01%~2%, based on the total mass of the solid electrolyte being 100%.

When the mass content of the lithium salt in solid electrolyte is 30%~90%, and the mass content of the additive is 0.01%~2%, on the one hand, due to the increase of the lithium salt concentration, the anions dissociated from the lithium salt agglomerate to form anion clusters, which greatly increases the transport number of lithium ions in the polymer; on the other hand, the lithium salt can be dissolved by the polymer, and would not precipitate alone, or form eutectic precipitation with the polymer, which can inhibit agglomeration of anion clusters and further improve ionic conductivity.

In some embodiments, based on the total mass of the solid electrolyte being 100%, the mass content of the lithium salt may be 30%, 31%, 33%, 38%, 40%, 43%, 51%, 54%, 60%, 64%, 67%, 72%, 75%, 81%, 84%, 88% or 90%; the mass content of the additive may be 0.01%, 0.05%, 0.1%, 0.3%, 0.6%, 1%, 1.2%, 1.5%, 1.8% or 2.0%.

In some embodiments, the mass content of the lithium salt is 50%~80%, based on the total mass of the solid electrolyte being 100%.

If the mass content of lithium salt is too low, the lithium salt dissolves in polymer, polar functional groups in polymer (such as —CH$_2$—CH$_2$O— in polyethylene oxide) form complex with lithium ions, anions are distributed among polymer segments, and lithium ions transport through the movement of polymer segments, limited by the efficiency of lithium ion transport mode, the ion transference number of electrolyte is generally lower than 10$^{-5}$ S·cm$^2$ at room temperature. If the mass content of lithium salt is too high, the lithium salt cannot be completely dissociated by polymer, the lithium salt or polymer-lithium salt eutectic crystal would precipitate in crystal form, and the conductivity of electrolyte would decrease.

In some embodiments, the mass content of the additive is 0.01%~1%, and more preferably, the mass content of the additive is 0.1%~1%, based on the total mass of the solid electrolyte being 100%.

At present, there is a technical solution of adding plasticizer to solid electrolyte in the prior art. However, the plasticizer is used in an amount of more than 10 weight %, which increases the safety risk of flammability of the battery on the one hand, and decreases the mechanical strength of the electrolyte on the other hand. The additive provided by the disclosure can obviously improve the ionic conductivity of the solid electrolyte with a small addition amount, and meanwhile, the influence on the safety of the battery and the influence on the mechanical strength of the battery can be ignored. The additive used in the disclosure is different from the conventional liquid plasticizer, and its main function is to complex with lithium ions and cooperate with anion cluster network to form a large number of lithium ion transmission channels independent of segmental motion, thus greatly improving the ionic conductivity of the polymer electrolyte at room temperature.

The additive adopted by the disclosure is selected from an aprotic organic solvent with a carbon number lower than 10 and a relative dielectric constant higher than 3.6. The higher the relative dielectric constant of the additive, the higher its polarity, the higher its solubility to the lithium salt, which helps the dissociation of the lithium salt in polymer. The additive is complexed with lithium ions dissociated from the lithium salt to form solvated ions, thus reducing the activation energy of lithium ions. If the relative dielectric constant of the additive is too low, the dissociation ability of lithium salt would be insufficient. If the carbon number of the additive is too high, the additive would become solid or the viscosity would increase, which is not conducive to the solvation process of lithium ions.

In some embodiments, the additive is selected from one or more of nitriles, sulfones, sulfoxides, sulfates, sulfites, sulfonates, ketones, ethers, carboxylates, carbonates, phosphates, borates, silicates and amides.

In a more preferred embodiment, the additive is selected from one or more of dimethyl sulfoxide, sulfolane, 1,3-propane sultone, γ-butyrolactone, ethyl acetate, trimethyl borate, trimethyl phosphate, dimethyl oxalate, dimethyl carbonate, ethylene carbonate, propylene carbonate, N-methylpyrrolidone, acetone, methyl ethyl ketone, tetrahydrofuran, 1,3-dioxolane, ethylene glycol dimethyl ether, acetonitrile and succinonitrile.

In some embodiments, the dielectric constant of the polymer is greater than 2, and preferably greater than 2.8. The relative dielectric constant of the polymer electrolyte provided by the present disclosure is greater than 2, which is due to the fact that when the polarity of the polymer is small and the mass content of the lithium salt is 30%~90%, the dissociation ability of the polymer to the lithium salt would be insufficient, the lithium salt would not be uniformly dispersed in the polymer, and the undissolved lithium salt would greatly reduce the lithium ion mobility speed.

More preferably, the polymer is selected from one or more of a homopolymer or a copolymer containing a halogenated or unhalogenated repeating unit; wherein the repeating unit is selected from one or more of a halogenated or unhalogenated alkylene oxide compound, a halogenated or unhalogenated siloxane compound, a halogenated or unhalogenated olefin compound, a halogenated or unhalogenated acrylate compound, a halogenated or unhalogenated carboxylic acid ester compound, a halogenated or unhalogenated carbonate compound, a halogenated or unhalogenated amide compound and a halogenated or unhalogenated cyano-containing compound.

Preferably, the weight-average molecular weight of the polymer is 1,000~10,000,000.

When the weight-average molecular weight of the polymer is within the above range, the polymerization degree of the polymer is controlled within an appropriate range, it is possible to obtain a solid polymer electrolyte which not only has higher ionic conductivity and larger lithium cation transference number, but also has excellent mechanical strength and electrochemical stability. When the weight-average molecular weight of the polymer is too low, the mechanical properties of electrolyte are insufficient, and the electrolyte would be in the state of liquid or semi-solid. After being prepared into solid electrolyte, the growth of lithium dendrites in the process of battery cycle can not be suppressed, which would cause battery short circuit. When the weight-average molecular weight of the polymer is too high, it is difficult to process the polymer, and thus the preparation of the thin-layer polymer solid electrolyte is not easy to realize. In should be noted that in this specification, the term "weight-average molecular weight (Mw)" represents the conversion value of standard polyethylene oxide determined by Gel Permeation Chromatography (GPC). The polymer solution passes through a separation column composed of porous carriers, and macromolecules with different molecular volumes are located in different positions and stay for different time length in the column, thus realizing separation.

In some embodiments, the lithium salt includes one or more of LiBr, LiI, LiClO$_4$, LiBF$_4$, LiPF$_6$, LiSCN, LiB$_{10}$Cl$_{10}$, LiCF$_3$SO$_3$, LiCF$_3$CO$_2$, LiBF$_2$C$_2$O$_4$, LiB(C$_2$O$_4$)$_2$, LiN(SO$_2$CF$_3$)$_2$, LiN(SO$_2$F)$_2$, LiN(SO$_2$F)(SO$_2$CF$_3$), LiC(SO$_2$CF$_3$)$_3$ and LiPF$_2$(C$_2$O$_4$).

The lithium salt is easy to dissociate in the selected polymer, and when the lithium salt content is increased, it would not precipitate alone or as polymer-lithium salt eutectic crystal. Preferably, the lithium salt is selected from one or more of LiN(SO$_2$CF$_3$)$_2$, LiN(SO$_2$F)$_2$, LiN(SO$_2$F)(SO$_2$CF$_3$), LiC(SO$_2$CF$_3$)$_3$, LiPF$_2$(C$_2$O$_4$), or a composition thereof with other salts.

In some embodiments, the solid electrolyte further includes an inorganic filler.

On the one hand, the inorganic filler inhibits polymer crystallization, and meanwhile, inorganic particles interact with electrolyte interface, which can provide higher conductivity of electrolyte; on the other hand, the addition of the inorganic filler would also increase the mechanical strength of electrolyte.

The mass content of the inorganic filler is less than or equal to 40%, based on the total mass of the solid electrolyte being 100%.

When the mass content of the inorganic filler is higher than 40%, the mechanical strength of the solid electrolyte is affected, and the film-forming property would become poor.

The median diameter ($d_{50}$) of the inorganic filler is 5 nanometers to 5 micrometers.

And the inorganic filler includes one or more of LiF, LiCl, Li$_2$CO$_3$, SiO$_2$, Al$_2$O$_3$, TiO$_2$, ZrO$_2$, MgO, Li$_7$La$_3$Zr$_2$O$_{12}$, Li$_x$La$_3$Zr$_y$A$_{2-y}$O$_{12}$, sulfide electrolyte, Li$_{1.3}$Al$_{0.3}$Ti$_{1.7}$(PO$_4$)$_3$, Li$_{1.5}$Al$_{0.5}$Ge$_{1.5}$(PO$_4$)$_3$, Li$_{2.88}$PO$_{3.73}$N$_{0.14}$, montmorillonite, kaolin and diatomite, wherein, in Li$_x$La$_3$Zr$_y$A$_{2-y}$O$_{12}$, A is selected from one of Ta, Al and Nb, $6 \leq x \leq 7$, $0.5 \leq y \leq 2$.

In an embodiment, the sulfide electrolyte is selected from Li$_{10}$GeP$_2$S$_{12}$.

In some embodiments, the solid electrolyte further includes a porous structure support layer, the porous structure support layer includes one or more of PVDF, PVDF-HFP, polyimide, cellulose and its modified products, nylon, polyethylene, polypropylene, glass fiber and carbon fiber.

The introduction of the porous structure support layer in the solid electrolyte can bring support effects to the electrolyte and further improve the mechanical properties of the solid electrolyte.

Another embodiment of the disclosure provides a polymer lithium ion battery, including a positive electrode, a negative electrode and the above-described solid electrolyte.

The positive electrode includes a positive electrode active material, a binder and a conductive agent, wherein the positive electrode active material is selected from at least one of LiNi$_x$Co$_y$Mn$_z$L$_{(1-x-y-z)}$O$_2$, LiCo$_x$L$_{(1-x)}$O$_2$, LiNi$_{x''}$L'$_{y'}$Mn$_{(2-x''-y')}$O$_4$, Li$_z$MPO$_4$; wherein, L is one of Al, Sr, Mg, Ti, Ca, Zr, Zn, Si or Fe; $0 \leq x \leq 1$, $0 \leq y \leq 1$, $0 \leq z \leq 1$, $0 \leq x+y+z \leq 1$, $0 \leq x' \leq 1$, $0.3 \leq x'' \leq 0.6$, $0.01 \leq y' \leq 0.2$; L' is at least one of Co, Al, Sr, Mg, Ti, Ca, Zr, Zn, Si or Fe; $0.5 \leq z' \leq 1$, M at least one of Fe, Mn and Co.

Specifically, the positive electrode active material may be selected from one or more of lithium cobaltate, nickel cobalt aluminum, nickel cobalt manganese, lithium iron manganese phosphate, lithium manganate and lithium iron phosphate.

The negative electrode active material of the negative electrode may be a conventional negative electrode material of a lithium ion battery, and examples thereof are not particularly limited. As representative examples of the negative electrode active material, it can be selected from lithium titanate oxide (LTO); carbon, such as ungraphitized carbon and graphitized carbon; LiXFe$_2$O$_3$ ($0 \leq x \leq 1$), Li$_x$WO$_2$ ($0 \leq x \leq 1$); lithium metal; lithium alloy; silicon alloy; tin alloy; metal oxides, such as SnO, SnO$_2$, PbO, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$ and Bi$_2$O$_5$; electrically conductive polymers such as polyacetylene; Li—Co—Ni based materials; titanium oxide; and the like.

The present disclosure will be further explained with the following embodiments.

Embodiment 1

The embodiment is used to illustrate the solid electrolyte, polymer lithium ion battery and the preparation method thereof, including the following preparation steps.

(1) Preparation of the Solid Electrolyte

Firstly, 1.0 g of dimethyl sulfoxide was dissolved in 99 g of acetonitrile to prepare a dimethyl sulfoxide solution (1 wt %); then, 1.0 g of polyethylene oxide (PEO) with molecular weight of 1,000,000 and 2.13 g of $LiN(SFO_2)_2$ were dissolved in 30 g of acetonitrile, and then 1.57 g of the above dimethyl sulfoxide solution (1 wt %) was added to obtain a solid electrolyte solution. The solid electrolyte solution was cast against a polytetrafluoroethylene (PTFE) template, volatilized at room temperature for 4 h, and dried in vacuum at 60° C. for 6 h to obtain a solid electrolyte, and the thickness of the electrolyte membrane was about 50 um. The lithium salt content was 67.7 wt % and dimethyl sulfoxide content was 0.5 wt %.

(2) Characterizations of Solid Electrolyte

Test for membrane thickness: the thicknesses of five points on the solid electrolyte membrane were measured with a thickness meter, and the average value was calculated.

ionic conductivity: a 2032 button battery was assembled with platinum sheet as working electrode. Electrochemical AC impedance spectroscopy was employed to measure the impedance of solid electrolyte, and the frequency range was 0.01 Hz~7000 kHz. The ionic conductivity of solid electrolyte was calculated with the formula $G=D/RS$, where D is the thickness of solid electrolyte, R is the ohm of solid electrolyte obtained by AC impedance test, which is the value of the first intersection between Nernst curve and X axis, and S is the area of solid electrolyte.

(3) Test Method for the Performances of Polymer Battery

Preparation of positive electrode sheet: polyvinylidene fluoride (PVDF) was dissolved in N-methylpyrrolidone (NMP), the positive electrode active material of $LiFePO_4$, PVDF, conductive carbon black and the above solid electrolyte were mixed according to the mass ratio of 83:4:3:10, and NMP was added to grind until the mixture was uniform. The slurry obtained above was uniformly coated on an aluminum foil, the thickness was 70~100 dried at 80° C. until no significant liquid was observed, and then vacuum-dried at 120° C. for 12 hours.

Battery assembly: a lithium sheet with thickness of about 35 μm was selected as negative electrode. The 2032 button battery was assembled in the order of negative shell, elastic sheet, gasket, lithium sheet, solid electrolyte, positive electrode, gasket, positive electrode shell.

Test for battery charge and discharge performances: LAND battery tester was employed to test the rate performance and cycle performance for the charge and discharge of the polymer battery. Test method for cycle performance is as follows: charged with 0.2C constant current to 3.65V, then charged with constant voltage until the current dropped to 0.20 mA, and then discharged with 0.2C constant current to 2.5V. After 100 cycles, the discharge capacity of first cycle and discharge capacity of 100th cycle were recorded, and then the capacity retention rate of battery was calculated according to the formula: capacity retention rate=100th cycle discharge capacity/first cycle discharge capacity× 100%. Test method for rate performance is as follows: charged with 0.1C constant current to 3.65V, then charged with constant voltage until the current dropped to 0.20 mA, and then discharged to 2.5V with constant currents of 0.1C, 0.2C, 0.5C, 1.0C and 2.0C. The battery was cycled at different rates for 5 cycles, and the discharge capacity at each rate was recorded.

Embodiment 2

The embodiment is used to illustrate the solid electrolyte, polymer lithium ion battery and the preparation method thereof, including most of the preparation steps of Embodiment 1, except that:
polyethylene oxide used as the polymer in the solid electrolyte was replaced with ethylene oxide-propylene oxide copolymer (EO/PO=1:1 mol).

Embodiment 3

The embodiment is used to illustrate the solid electrolyte, polymer lithium ion battery and the preparation method thereof, including most of the preparation steps of Embodiment 1, except that:
$LiN(SFO_2)_2$ used as the lithium salt in the solid electrolyte was replaced with $LiPF_2(C_2O_4)$.

Embodiment 4

The embodiment is used to illustrate the solid electrolyte, polymer lithium ion battery and the preparation method thereof, including most of the preparation steps of Embodiment 1, except that:
dimethyl sulfoxide used as the additive in the solid electrolyte was replaced with adiponitrile.

Embodiment 5

The embodiment is used to illustrate the solid electrolyte, polymer lithium ion battery and the preparation method thereof, including most of the preparation steps of Embodiment 1, except that:
after the solid electrolyte solution was prepared, 0.1656 g of alumina nano powder was added, the particle size of the alumina nano powder was 8~12 nm, and $d_{50}=10$ nm, then dispersed with ultrasonic dispersion, the solid electrolyte solution was dried in a polytetrafluoroethylene template, volatilized at room temperature for 4 h, and then dried in vacuum at 60° C. for 6 h to obtain a solid electrolyte.

Embodiment 6

The embodiment is used to illustrate the solid electrolyte, polymer lithium ion battery and the preparation method thereof, including most of the preparation steps of Embodiment 1, except that:
after the solid electrolyte solution was prepared, 0.7864 g of kaolin powder with particle size of $d_{50}=3$ μm was added, then dispersed with ultrasonic dispersion, the solid electrolyte solution was dried in a polytetrafluoroethylene template, volatilized at room temperature for 4 h, and then dried in vacuum at 60° C. for 6 h to obtain a solid electrolyte.

Embodiment 7

The embodiment is used to illustrate the solid electrolyte, polymer lithium ion battery and the preparation method thereof, including most of the preparation steps of Embodiment 1, except that:
dimethyl sulfoxide used as the additive in the solid electrolyte was replaced with dibutyl phthalate;
after the solid electrolyte solution was prepared, 1.348 g of LLZTO (lithium lanthanum zirconium oxygen)

powder with particle size of $d_{50}$=8 μm was added, then dispersed with ultrasonic dispersion, the solid electrolyte solution was dried in a polytetrafluoroethylene template, volatilized at room temperature for 4 h, and then dried in vacuum at 60° C. for 6 h to obtain a solid electrolyte.

Embodiment 8

The embodiment is used to illustrate the solid electrolyte, polymer lithium ion battery and the preparation method thereof, including most of the preparation steps of Embodiment 1, except that:

after the solid electrolyte solution was prepared, the solid electrolyte solution was soaked in the bacterial cellulose membrane, and the porosity of the bacterial cellulose membrane was calculated to be 85 vol % with Archimedes method; the solid electrolyte solution was soaked again after the solvent was volatilized at room temperature, these steps were repeated until the pores were completely filled with the solid electrolyte, then dried in vacuum at 60° C. for 6 h, and the average thickness of the solid electrolyte membrane was 52 μm.

Embodiment 9

The embodiment is used to illustrate the solid electrolyte, polymer lithium ion battery and the preparation method thereof, including most of the preparation steps of Embodiment 1, except that:

after the solid electrolyte solution was prepared, the solid electrolyte solution was soaked in the glass fiber, and the porosity of the glass fiber was calculated to be 55 vol % with Archimedes method; the solid electrolyte solution was soaked again after the solvent was volatilized at room temperature, these steps were repeated until the pores were completely filled with the solid electrolyte, then dried in vacuum at 60° C. for 6 h, and the average thickness of the solid electrolyte membrane was 60 μm.

Embodiment 10

The embodiment is used to illustrate the solid electrolyte, polymer lithium ion battery and the preparation method thereof, including most of the preparation steps of Embodiment 5, except that:

the thickness of the solid electrolyte membrane was tested to be 53 um, the positive electrode active material of $LiFePO_4$ was replaced with $LiMn_{0.5}Fe_{0.5}PO_4$.

Test for battery charge and discharge performances: LAND battery tester was employed to test the rate performance and cycle performance for the charge and discharge of the polymer battery. Test method for cycle performance is as follows: charged with 0.2C constant current to 4.2V, then charged with constant voltage until the current dropped to 0.20 mA, and then discharged with 0.2C constant current to 3.0V. After 100 cycles, the discharge capacity of first cycle and discharge capacity of 100th cycle were recorded, and then the capacity retention rate of battery was calculated according to the formula: capacity retention rate=100th cycle discharge capacity/first cycle discharge capacity× 100%. Test method for rate performance is as follows: charged with 0.1C constant current to 4.2V, then charged with constant voltage until the current dropped to 0.20 mA, and then discharged to 3.0V with constant currents of 0.1C, 0.2C, 0.5C, 1.0C and 2.0C. The battery was cycled at different rates for 5 cycles, and the discharge capacity at each rate was recorded.

Embodiment 11

The embodiment is used to illustrate the solid electrolyte, polymer lithium ion battery and the preparation method thereof, including most of the preparation steps of Embodiment 5, except that:

the thickness of the solid electrolyte membrane was tested to be 52 um, the positive electrode active material of $LiFePO_4$ was replaced with $LiNi_{0.6}Mn_{0.2}Co_{0.2}O_2$.

Test for battery charge and discharge performances: LAND battery tester was employed to test the rate performance and cycle performance for the charge and discharge of the polymer battery. Test method for cycle performance is as follows: charged with 0.2C constant current to 4.2V, then charged with constant voltage until the current dropped to 0.20 mA, and then discharged with 0.2C constant current to 3.0V. After 100 cycles, the discharge capacity of first cycle and discharge capacity of 100th cycle were recorded, and then the capacity retention rate of battery was calculated according to the formula: capacity retention rate=100th cycle discharge capacity/first cycle discharge capacity× 100%. Test method for rate performance is as follows: charged with 0.1C constant current to 4.2V, then charged with constant voltage until the current dropped to 0.20 mA, and then discharged to 3.0V with constant currents of 0.1C, 0.2C, 0.5C, 1.0C and 2.0C. The battery was cycled at different rates for 5 cycles, and the discharge capacity at each rate was recorded.

Embodiment 12

The embodiment is used to illustrate the solid electrolyte, polymer lithium ion battery and the preparation method thereof, including most of the preparation steps of Embodiment 5, except that:

the thickness of the solid electrolyte membrane was tested to be 54 um, the positive electrode active material of $LiFePO_4$ was replaced with $LiCoO_2$.

Test for battery charge and discharge performances: LAND battery tester was employed to test the rate performance and cycle performance for the charge and discharge of the polymer battery. Test method for cycle performance is as follows: charged with 0.2C constant current to 4.35V, then charged with constant voltage until the current dropped to 0.20 mA, and then discharged with 0.2C constant current to 3.0V. After 100 cycles, the discharge capacity of first cycle and discharge capacity of 100th cycle were recorded, and then the capacity retention rate of battery was calculated according to the formula: capacity retention rate=100th cycle discharge capacity/first cycle discharge capacity× 100%. Test method for rate performance is as follows: charged with 0.1C constant current to 4.35V, then charged with constant voltage until the current dropped to 0.20 mA, and then discharged to 3.0V with constant currents of 0.1C, 0.2C, 0.5C, 1.0C and 2.0C. The battery was cycled at different rates for 5 cycles, and the discharge capacity at each rate was recorded.

Embodiment 13

The embodiment is used to illustrate the solid electrolyte, polymer lithium ion battery and the preparation method thereof, including most of the preparation steps of Embodiment 1, except that:

dimethyl sulfoxide used as the additive in the solid electrolyte was replaced with ethylene glycol dimethyl ether;

after the solid electrolyte solution was prepared, 1.348 g of LLZTO (lithium lanthanum zirconium oxygen) powder with particle size of $d_{50}=2$ μm was added, then dispersed with ultrasonic dispersion, the mixed solution was soaked in a PVDF-HFP porous fiber, the PVDF-HFP porous fiber was obtained with electrostatic spinning method, and the porosity was calculated to be 70 vol % with Archimedes method; the solution was soaked again after the solvent was volatilized at room temperature, these steps were repeated until the pores were completely filled with the solid electrolyte, then dried in vacuum at 60° C. for 6 h, a solid electrolyte was obtained.

Embodiment 14

The embodiment is used to illustrate the solid electrolyte, polymer lithium ion battery and the preparation method thereof, including most of the preparation steps of Embodiment 1, except that:
2 g of dimethyl sulfoxide was dissolved in 98.2 g of acetonitrile to prepare a dimethyl sulfoxide solution (2 wt %).

Embodiment 15

The embodiment is used to illustrate the solid electrolyte, polymer lithium ion battery and the preparation method thereof, including most of the preparation steps of Embodiment 1, except that:
0.2 g of dimethyl sulfoxide was dissolved in 99.9 g of acetonitrile to prepare a dimethyl sulfoxide solution (0.2 wt %).

Embodiment 16

The embodiment is used to illustrate the solid electrolyte, polymer lithium ion battery and the preparation method thereof, including most of the preparation steps of Embodiment 1, except that:
the content of lithium salt in the solid electrolyte was 41.2 wt %.

Embodiment 17

The embodiment is used to illustrate the solid electrolyte, polymer lithium ion battery and the preparation method thereof, including most of the preparation steps of Embodiment 1, except that:
the content of lithium salt in the solid electrolyte was 81.3 wt %.

Comparative Example 1

The comparative example is used to illustrate the solid electrolyte, polymer lithium ion battery and the preparation method thereof with comparison, including most of the preparation steps of Embodiment 1, except that:
dimethyl sulfoxide was not added to the solid electrolyte.

Comparative Example 2

The comparative example is used to illustrate the solid electrolyte, polymer lithium ion battery and the preparation method thereof with comparison, including most of the preparation steps of Embodiment 1, except that:
the content of lithium salt in the solid electrolyte was 19 wt %.

Comparative Example 3

The comparative example is used to illustrate the solid electrolyte, polymer lithium ion battery and the preparation method thereof with comparison, including most of the preparation steps of Embodiment 4, except that:
the content of adiponitrile in the solid electrolyte was 15 wt %.

Comparative Example 4

The comparative example is used to illustrate the solid electrolyte, polymer lithium ion battery and the preparation method thereof with comparison, including most of the preparation steps of Embodiment 1, except that:
the content of lithium salt in the solid electrolyte was 19 wt %, and dimethyl sulfoxide was not added to the solid electrolyte.

Performance Test

The test results of ionic conductivity are shown in Table 1.

TABLE 1

| Embodiments/Comparative examples | Ionic conductivity/S cm$^{-1}$ at 25° C. |
|---|---|
| Embodiment 1 | $5.6 \times 10^{-4}$ |
| Embodiment 2 | $5.2 \times 10^{-4}$ |
| Embodiment 3 | $3.1 \times 10^{-4}$ |
| Embodiment 4 | $6.5 \times 10^{-4}$ |
| Embodiment 5 | $9.8 \times 10^{-4}$ |
| Embodiment 6 | $2.3 \times 10^{-3}$ |
| Embodiment 7 | $1.2 \times 10^{-3}$ |
| Embodiment 8 | $2.6 \times 10^{-4}$ |
| Embodiment 9 | $1.5 \times 10^{-4}$ |
| Embodiment 13 | $2.3 \times 10^{-4}$ |
| Embodiment 14 | $6.3 \times 10^{-4}$ |
| Embodiment 15 | $3.5 \times 10^{-4}$ |
| Embodiment 16 | $2.1 \times 10^{-4}$ |
| Embodiment 17 | $3.1 \times 10^{-4}$ |
| Comparative example 1 | $1.2 \times 10^{-5}$ |
| Comparative example 2 | $4.7 \times 10^{-6}$ |
| Comparative example 3 | $2.5 \times 10^{-4}$ |
| Comparative example 4 | $1.7 \times 10^{-5}$ |

Comparing the test results of Comparative example 2 and Embodiment 1 in Table 1, it can be seen that when dimethyl sulfoxide (0.5 wt %) was added to the solid electrolyte, the ionic conductivity of the electrolyte increased from $4.7 \times 10^{-6}$ S cm$^{-1}$ to $5.6 \times 10^4$S cm$^{-1}$, indicating that a small amount of additives could effectively improve the ionic conductivity of the electrolyte when the lithium salt content was high (67.7 wt %). According to the test results of Embodiment 1, Comparative Examples 1, 2 and 4, it can be seen that when the lithium salt content in the solid electrolyte was low (19 wt %), the ionic conductivity of the solid electrolyte was only $4.7 \times 10^{-6}$ S cm$^{-1}$, and a small amount of additive added could hardly contribute to the conductivity. This was because when the lithium salt content was low, the ion transport was realized through the segmental motion of polymer, a small amount of additive had no effects on the segmental motion of polymer. However, when the lithium salt content was high (67.7 wt %), lithium ions were complexed by polymer segments, and anions would form a ion cluster. When a small amount of dimethyl sulfoxide was added, it could help the transport of lithium ions in anion clusters, and the ionic conductivity would be greatly improved, from $1.2\times10^{-5}$ S cm$^{-1}$-1 of Comparative example 1 to $5.6\times10^4$ S cm$^{-1}$ of Embodiment 1. The ionic conductivities of solid electrolytes in Embodiments 2, 3 and 4 at room temperature were greater than $3\times10^4$ S cm$^{-1}$, which indicated that a small amount of functional additive was beneficial to the transport of lithium ions in the electrolyte when the concentration of lithium salt was high. This transport mechanism is universal.

conductivity of electrolyte from $5.6\times10^4$ S cm$^{-1}$ to $1.5\times10^4$ S cm$^{-1}$, but the mechanical tensile strength of electrolyte membrane increased from 60 MPa to 150 MPa. Comparing Embodiments 1, 8 and 9, it can be found that the addition of porous structure supporting layer could effectively improve the mechanical tensile strength of electrolyte, and the ionic conductivity of electrolyte could be maintained above $1\times10^{-4}$ S cm$^{-1}$.

The test results of battery performances are shown in Table 2.

TABLE 2

| Embodiments/ Comparative examples | First discharge capacity/ mAh g$^{-1}$ at 45° C., 0.1 C | Rate performance at 45° C. | | | | The 100th cycle capacity retention rate at 45° C., 0.2 C |
|---|---|---|---|---|---|---|
| | | 0.2 C/ 0.1 C | 0.5 C/ 0.1 C | 1.0 C/ 0.1 C | 2.0 C/ 0.1 C | |
| Embodiment 1 | 147.5 | 93.55% | 87.77% | 79.27% | 56.81% | 92.4% |
| Embodiment 2 | 135.7 | 91.25% | 86.03% | 77.13% | 49.28% | 93.6% |
| Embodiment 3 | 140.4 | 89.52% | 84.54% | 75.32% | 45.10% | 90.9% |
| Embodiment 4 | 146.3 | 93.63% | 88.47% | 78.99% | 57.59% | 93.0% |
| Embodiment 5 | 150.5 | 95.28% | 89.25% | 82.65% | 60.35% | 92.5% |
| Embodiment 6 | 157.7 | 96.65% | 90.23% | 83.54% | 62.68% | 95.2% |
| Embodiment 7 | 153.5 | 95.69% | 88.89% | 83.00% | 61.18% | 93.5% |
| Embodiment 8 | 139.9 | 93.86% | 83.28% | 83.65% | 43.98% | 94.7% |
| Embodiment 9 | 135.2 | 90.51% | 80.05% | 73.57% | 39.59% | 93.2% |
| Embodiment 10 | 130 | 94.83% | 90.26% | 83.62% | 62.48% | 78.2% |
| Embodiment 11 | 165.2 | 92.32% | 85.45% | 75.95% | 50.91% | 70.5% |
| Embodiment 12 | 125.4 | 91.48% | 88.55% | 78.87% | 56.35% | 66.8% |
| Embodiment 13 | 148.1 | 93.92% | 88.04% | 78.78% | 57.86% | 94.3% |
| Embodiment 14 | 146.4 | 94.65% | 89.78% | 80.37% | 58.47% | 90.3% |
| Embodiment 15 | 140.5 | 88.55% | 85.72% | 76.24% | 53.26% | 93.2% |
| Embodiment 16 | 132.6 | 84.55% | 78.54% | 72.23% | 39.85% | 94.5% |
| Embodiment 17 | 135.6 | 85.35% | 80.53% | 73.15% | 43.32% | 91.4% |
| Comparative example 1 | 38.3 | 58.26% | 12.86% | — | — | — |
| Comparative example 2 | 21.5 | 18.59% | — | — | — | — |
| Comparative example 3 | 153.3 | 92.33% | 88.52% | 80.95% | 58.33% | 82.5% |
| Comparative example 4 | 22.5 | 17.59% | — | — | — | — |

Comparing the test results of Embodiment 1 and Embodiment 5, it can be seen that with the addition of nano alumina (5 wt %), the ionic conductivity of electrolyte was increased from $5.6\times10^4$ S cm$^{-1}$ to $9.8\times10^4$ S cm$^{-1}$. Comparing the test results of Embodiment 1 and Embodiment 6, it can be seen that with the addition of kaolin (20 wt %), the ionic conductivity of electrolyte increased from $5.6\times10^4$ S cm$^{-1}$ to $2.3\times10^{-3}$ S cm$^{-1}$. Comparing the test results of Embodiment 1 and Embodiment 7, it can be seen that with the addition of LLZTO (30 wt %), the ionic conductivity of electrolyte increased from $5.6\times10^4$ S cm$^{-1}$ to $1.2\times10^{-3}$ S cm$^{-1}$. Comparing Embodiments 1, 5, 6 and 7, it can be found that the ionic conductivity of the solid electrolyte of the present disclosure at room temperature could be effectively improved by adding inorganic particles, and the ionic conductivity at 25° C. could reach $1\times10^{-3}$ S cm$^{-1}$ under an optimized condition.

Compared Embodiment 1 and Embodiment 8, it can be seen that the introduction of bacterial cellulose membrane reduced the ionic conductivity of electrolyte from $5.6\times10^4$ S cm$^{-1}$ to $2.6\times10^4$ S cm$^{-1}$, but the mechanical tensile strength of electrolyte membrane increased from 60 MPa to 120 MPa. Comparing Embodiment 1 and Embodiment 9, the introduction of glass fiber membrane reduced the ionic It can be seen from the battery performance results of Embodiments 1~17 in Table 2 that the discharge capacity (at 45° C., 0.1C) of the battery prepared with the solid electrolyte of the present disclosure reached over 85% of the theoretical capacity, and the capacity retention rate of the battery with LFP as the positive electrode was over 90% at 0.2C after 100 cycles, indicating that the improvements of ionic conductivity of electrolyte could effectively reduce the operating temperature of the solid lithium ion battery. It can be seen from the results of Embodiments 10, 11 and 12 that when different materials (such as LFMP, NMC, LiCoO$_2$) were used as positive electrodes, and the battery charging and discharging voltages were 2.7V~4.3V, 2.75V~4.2V, 3.0V~4.4V, the batteries could still be charged and discharged, but the capacity retention rates after 100 cycles were decreased, indicating that the solid electrolyte provided by the present disclosure had better cooperation effects with the positive electrode active material of low charging and discharging voltage. Comparing Embodiments 1, 8 and 9, it can be found that the capacity retention rate after 100 cycles was improved when the porous structure supporting layer was introduced into the electrolyte, which was because the introduction of the porous structure supporting layer improved the mechanical strength of the electrolyte and inhibited the dendrite growth of the lithium metal on negative electrode.

It should be noted that in the present disclosure, the singular terms "a", "an" and "the" include plural reference and vice versa unless the context clearly indicates otherwise.

The above are only preferred embodiments of the present disclosure, not intended to limit the present disclosure. Any modifications, equivalent substitutions and improvements made within the spirit and principles of the present disclosure shall be included in the protection scope of the present disclosure.

The invention claimed is:

1. A solid electrolyte, used for polymer lithium ion batteries, having the quality of consisting of a polymer, a lithium salt, an additive, an inorganic filler and a porous structure supporting layer; wherein the additive is selected from an aprotic organic solvent with a carbon number lower than 10 and a relative dielectric constant higher than 3.6;
the mass content of the lithium salt is 30%~90%, and the mass content of the additive is 0.01%~2%, based on the total mass of the solid electrolyte being 100%; and
the porous structure supporting layer comprises a bacterial cellulose membrane.

2. The solid electrolyte of claim 1, wherein the mass content of the lithium salt is 50%~80% based on the total mass of the solid electrolyte being 100%.

3. The solid electrolyte of claim 1, wherein the additive is selected from one or more of nitriles, sulfones, sulfoxides, sulfates, sulfites, sulfonates, ketones, ethers, carboxylates, carbonates, phosphates, borates, silicates and amides.

4. The solid electrolyte of claim 1, wherein the additive is selected from one or more of dimethyl sulfoxide, sulfolane, 1,3-propane sultone, γ-butyrolactone, ethyl acetate, trimethyl borate, trimethyl phosphate, dimethyl oxalate, dimethyl carbonate, ethylene carbonate, propylene carbonate, N-methylpyrrolidone, acetone, methyl ethyl ketone, tetrahydrofuran, 1,3-dioxolane, ethylene glycol dimethyl ether, acetonitrile and succinonitrile.

5. The solid electrolyte of claim 1, wherein the dielectric constant of the polymer is greater than 2.

6. The solid electrolyte according to claim 1, wherein the polymer is selected from one or more of a homopolymer or a copolymer containing a halogenated or unhalogenated repeating unit; wherein the repeating unit is selected from one or more of a halogenated or unhalogenated alkylene oxide compound, a halogenated or unhalogenated siloxane compound, a halogenated or unhalogenated olefin compound, a halogenated or unhalogenated acrylate compound, a halogenated or unhalogenated carboxylic acid ester compound, a halogenated or unhalogenated carbonate compound, a halogenated or unhalogenated amide compound and a halogenated or unhalogenated cyano-containing compound.

7. The solid electrolyte of claim 1, wherein the weight-average molecular weight of the polymer is 1,000~10,000,000.

8. The solid electrolyte of claim 1, wherein the lithium salt comprises one or more of LiBr, LiI, LiClO$_4$, LiBF$_4$, LiPF$_6$, LiSCN, LiB$_{10}$C$_{110}$, LiCF$_3$SO$_3$, LiCF$_3$CO$_2$, LiBF$_2$C$_2$O$_4$, LiB(C$_2$O$_4$)$_2$, LiN(SO$_2$CF$_3$)$_2$, LiN(SO$_2$F)$_2$, LiN(SO$_2$F)(SO$_2$CF$_3$), LiC(SO$_2$CF$_3$)$_3$ and LiPF$_2$(C$_2$O$_4$).

9. The solid electrolyte of claim 1, wherein the mass content of the inorganic filler is less than or equal to 40% based on the total mass of the solid electrolyte being 100%, and the inorganic filler comprises one or more of LiF, LiCl, Li$_2$CO$_3$, SiO$_2$, Al$_2$O$_3$, TiO$_2$, ZrO$_2$, MgO, Li$_7$La$_3$Zr$_2$O$_{12}$, Li$_x$La$_3$Zr$_y$A$_{2-y}$O$_{12}$, sulfide electrolyte, Li$_{1.3}$Al$_{0.3}$Ti$_{1.7}$(PO$_4$)$_3$, Li$_{1.5}$Al$_{0.5}$Ge$_{1.5}$(PO$_4$)$_3$, Li$_{2.88}$PO$_{3.73}$N$_{0.14}$, montmorillonite, kaolin and diatomite, wherein, in Li$_x$La$_3$Zr$_y$A$_{2-y}$O$_{12}$, A is selected from one of Ta, Al and Nb, 6≤x≤7, 0.5≤y≤2.

10. A polymer lithium ion battery, comprising a positive electrode, a negative electrode and the solid electrolyte of claim 1.

11. A polymer lithium ion battery, comprising a positive electrode, a negative electrode and the solid electrolyte of claim 2.

12. A polymer lithium ion battery, comprising a positive electrode, a negative electrode and the solid electrolyte of claim 3.

13. A polymer lithium ion battery, comprising a positive electrode, a negative electrode and the solid electrolyte of claim 4.

14. A polymer lithium ion battery, comprising a positive electrode, a negative electrode and the solid electrolyte of claim 5.

15. A polymer lithium ion battery, comprising a positive electrode, a negative electrode and the solid electrolyte of claim 6.

16. A polymer lithium ion battery, comprising a positive electrode, a negative electrode and the solid electrolyte of claim 7.

17. A polymer lithium ion battery, comprising a positive electrode, a negative electrode and the solid electrolyte of claim 8.

18. A polymer lithium ion battery, comprising a positive electrode, a negative electrode and the solid electrolyte of claim 9.

* * * * *